US012781519B2

(12) United States Patent
Audi et al.

(10) Patent No.: US 12,781,519 B2
(45) Date of Patent: Nov. 3, 2026

(54) DUAL-PURPOSE PROGRESSIVE STAGE LOAD-DISTRIBUTING AND ABSORBING SYSTEM

(71) Applicant: VICONIC SPORTING LLC, Dearborn, MI (US)

(72) Inventors: Richard Francois Audi, Dearborn, MI (US); Joel Matthew Cormier, Lathrup Village, MI (US)

(73) Assignee: VICONIC SPORTING LLC, Dearborn, MI (US)

( * ) Notice: Subject to any disclaimer, the term of this patent is extended or adjusted under 35 U.S.C. 154(b) by 149 days.

(21) Appl. No.: 18/671,760

(22) Filed: May 22, 2024

(65) Prior Publication Data

US 2024/0309658 A1 Sep. 19, 2024

Related U.S. Application Data

(63) Continuation-in-part of application No. 17/854,604, filed on Jun. 30, 2022, now Pat. No. 12,460,427.

(51) Int. Cl.

| | |
|---|---|
| ***E04F 15/22*** | (2006.01) |
| ***B60R 21/04*** | (2006.01) |
| ***E04F 15/18*** | (2006.01) |
| ***F16F 1/376*** | (2006.01) |
| ***F16F 7/12*** | (2006.01) |

(52) U.S. Cl.
CPC ............ *E04F 15/225* (2013.01); *B60R 21/04* (2013.01); *E04F 15/185* (2013.01); *E04F 15/22* (2013.01); *F16F 1/376* (2013.01); *F16F 7/121* (2013.01)

(58) Field of Classification Search
CPC ....... E04F 15/225; E04F 15/185; E04F 15/22; B60R 21/04; F16F 1/376; F16F 7/121
USPC .......................... 52/403.1; 428/177; 188/371
See application file for complete search history.

(56) References Cited

U.S. PATENT DOCUMENTS

| | | | |
|---|---|---|---|
| 1,784,511 | A | 12/1930 | Carns |
| 1,958,050 | A | 5/1934 | Koppelman |
| 1,995,728 | A | 3/1935 | Aldrich |
| 2,090,881 | A | 8/1937 | Wilson |

(Continued)

FOREIGN PATENT DOCUMENTS

| | | |
|---|---|---|
| EP | 1422344 | 5/2004 |
| EP | 2154291 | 2/2010 |

(Continued)

OTHER PUBLICATIONS

US 7,624,546 B2, 12/2009, Moller, Jr. (withdrawn)

*Primary Examiner* — Brent W Herring
(74) *Attorney, Agent, or Firm* — Brooks Kushman P.C.

(57) ABSTRACT

A multi-purpose progressive stage load distributing and absorbing system that has a flat ceiling and lies below a barrier layer that is exposed to percussive forces. The progressive stage load distributing and absorbing system is interposed between the barrier layer and a foundation. Included in the underlayment infrastructure are hat-shaped absorbing members that have a relatively compliant region, an optional intermediate region and one or more relatively stiff regions. In response to an applied load, there is a telescoping engagement between wall sections of the regions. During and after the load is removed, the system reverts to its undeflected state non-destructively.

15 Claims, 3 Drawing Sheets

(56) References Cited

U.S. PATENT DOCUMENTS

| | | | |
|---|---|---|---|
| 2,225,067 | A | 12/1940 | Marin |
| 2,275,575 | A | 3/1942 | Vrooman |
| 2,349,907 | A | 5/1944 | Kos et al. |
| 2,391,997 | A | 1/1946 | Noble |
| 2,434,641 | A | 1/1948 | Burns |
| 2,924,419 | A | 2/1960 | Wells |
| 3,011,602 | A | 12/1961 | Ensrud et al. |
| 3,018,015 | A | 1/1962 | Norton et al. |
| 3,071,216 | A | 1/1963 | Jones et al. |
| 3,108,924 | A | 10/1963 | Mountford |
| 3,196,763 | A | 7/1965 | Rushton |
| 3,204,667 | A | 9/1965 | Zahorski |
| 3,231,454 | A | 1/1966 | Joseph |
| 3,525,663 | A | 8/1970 | Hale |
| 3,597,891 | A | 8/1971 | Martin |
| 3,605,145 | A | 9/1971 | Graebe |
| 3,802,790 | A | 4/1974 | Blackburn |
| 3,828,715 | A | 8/1974 | Matsushita |
| 3,834,487 | A | 9/1974 | Hale |
| 3,871,636 | A | 3/1975 | Boyle |
| 3,876,492 | A | 4/1975 | Schott |
| 3,933,387 | A | 1/1976 | Salloum et al. |
| 3,938,963 | A | 2/1976 | Hale |
| 3,980,221 | A | 9/1976 | Okada |
| 3,997,207 | A | 12/1976 | Norlin |
| 4,029,280 | A | 6/1977 | Golz |
| 4,029,350 | A | 6/1977 | Goupy et al. |
| 4,190,276 | A | 2/1980 | Hirano et al. |
| 4,233,793 | A | 11/1980 | Omholt |
| 4,321,989 | A | 3/1982 | Meinzer |
| 4,352,484 | A | 10/1982 | Gertz et al. |
| 4,413,856 | A | 11/1983 | McMahan et al. |
| 4,497,853 | A | 2/1985 | Tomarin |
| 4,530,197 | A | 7/1985 | Rainville |
| 4,631,221 | A | 12/1986 | Disselbeck et al. |
| 4,635,981 | A | 1/1987 | Friton |
| 4,666,130 | A | 5/1987 | Denman et al. |
| 4,696,401 | A | 9/1987 | Wallace |
| 4,710,415 | A | 12/1987 | Slosberg et al. |
| 4,720,261 | A | 1/1988 | Fishwick et al. |
| 4,739,762 | A | 4/1988 | Palmaz |
| 4,755,416 | A | 7/1988 | Schneider et al. |
| 4,757,665 | A | 7/1988 | Hardigg |
| 4,844,213 | A | 7/1989 | Travis |
| 4,869,032 | A | 9/1989 | Geske |
| 4,879,857 | A | 11/1989 | Peterson et al. |
| 4,890,877 | A | 1/1990 | Ashtiani-Zarandi et al. |
| 4,909,661 | A | 3/1990 | Ivey |
| 4,980,877 | A | 12/1990 | Sugiyama et al. |
| 5,030,501 | A | 7/1991 | Colvin et al. |
| 5,033,593 | A | 7/1991 | Kazuhito |
| 5,054,753 | A | 10/1991 | Polus |
| 5,085,424 | A | 2/1992 | Wood, Jr. |
| 5,141,279 | A | 8/1992 | Weller |
| 5,165,990 | A | 11/1992 | Nakano |
| 5,192,157 | A | 3/1993 | Laturner |
| 5,306,066 | A | 4/1994 | Saathoff |
| 5,364,682 | A | 11/1994 | Tanaka et al. |
| 5,383,314 | A | 1/1995 | Rothberg |
| 5,390,467 | A | 2/1995 | Shuert |
| 5,391,251 | A | 2/1995 | Shuert |
| 5,399,406 | A | 3/1995 | Matsuo et al. |
| 5,401,347 | A | 3/1995 | Shuert |
| 5,435,619 | A | 7/1995 | Nakae et al. |
| 5,444,959 | A | 8/1995 | Tesch |
| 5,500,037 | A | 3/1996 | Alhamad |
| 5,518,802 | A | 5/1996 | Colvin et al. |
| 5,551,673 | A | 9/1996 | Furusawa et al. |
| 5,573,272 | A | 11/1996 | Teshima |
| 5,619,832 | A | 4/1997 | Myrvold |
| 5,636,866 | A | 6/1997 | Suzuki et al. |
| 5,660,426 | A | 8/1997 | Sugimori et al. |
| 5,679,967 | A | 10/1997 | Janai et al. |
| 5,700,545 | A | 12/1997 | Audi et al. |
| 5,727,826 | A | 3/1998 | Frank et al. |
| 5,744,763 | A | 4/1998 | Iwasa et al. |
| 5,762,392 | A | 6/1998 | Suga |
| 5,833,386 | A | 11/1998 | Rosan et al. |
| 5,972,477 | A | 10/1999 | Kim et al. |
| 6,017,084 | A | 1/2000 | Carroll, III et al. |
| 6,044,606 | A | 4/2000 | Hamar |
| 6,199,942 | B1 | 3/2001 | Carroll, III et al. |
| 6,205,728 | B1 | 3/2001 | Sutelan |
| 6,221,292 | B1 | 4/2001 | Carroll, III |
| 6,247,745 | B1 | 6/2001 | Carroll, III et al. |
| 6,315,339 | B1 | 11/2001 | Devilliers et al. |
| 6,318,755 | B1 | 11/2001 | Nusser et al. |
| 6,443,513 | B1 | 9/2002 | Glance |
| 6,547,280 | B1 | 4/2003 | Ashmead |
| 6,679,544 | B1 | 1/2004 | Hubbert et al. |
| 6,682,128 | B2 | 1/2004 | Carroll, III et al. |
| 6,687,907 | B1 | 2/2004 | Bortolini |
| 6,715,592 | B2 | 4/2004 | Suzuki et al. |
| 6,752,450 | B2 | 6/2004 | Carroll, III et al. |
| 6,763,322 | B2 | 7/2004 | Potyrailo et al. |
| 6,777,062 | B2 | 8/2004 | Skaja |
| RE38,745 | E | 6/2005 | Foster |
| 6,938,290 | B2 | 9/2005 | McKinney et al. |
| 7,033,666 | B2 | 4/2006 | Skaja |
| 7,143,876 | B2 | 12/2006 | Tamada et al. |
| 7,163,244 | B2 | 1/2007 | Meltzer |
| 7,249,662 | B2 | 7/2007 | Itou |
| 7,309,188 | B2 | 12/2007 | Ianniello et al. |
| 7,338,038 | B2 | 3/2008 | Maurer et al. |
| 7,360,822 | B2 | 4/2008 | Carroll, III et al. |
| 7,377,577 | B2 | 5/2008 | Carroll, III et al. |
| 7,384,095 | B2 | 6/2008 | Cormier et al. |
| 7,416,775 | B2 | 8/2008 | Snel |
| 7,441,758 | B2 | 10/2008 | Coffield et al. |
| 7,488,523 | B1 | 2/2009 | Muncaster et al. |
| 7,566,489 | B2 | 7/2009 | Starke |
| 7,574,760 | B2 | 8/2009 | Foley et al. |
| 7,575,796 | B2 | 8/2009 | Scott et al. |
| 7,625,023 | B2 | 12/2009 | Audi et al. |
| 7,690,160 | B2 | 4/2010 | Moller, Jr. |
| 7,810,291 | B2 | 10/2010 | McPherson |
| 7,866,248 | B2 | 1/2011 | Moore, III et al. |
| 7,900,416 | B1 | 3/2011 | Yokubison et al. |
| 7,908,802 | B2 | 3/2011 | Frederiksen |
| 7,958,681 | B2 | 6/2011 | Moller, Jr. |
| 8,061,098 | B2 | 11/2011 | Whelan et al. |
| 8,146,310 | B2 | 4/2012 | Keene |
| 8,221,856 | B2 | 7/2012 | Stroppiana |
| 8,353,640 | B2 | 1/2013 | Sawyer |
| 8,458,987 | B2 | 6/2013 | Becker |
| 8,465,087 | B2 | 6/2013 | Gerwolls et al. |
| 8,528,280 | B2 | 9/2013 | Coil et al. |
| 8,568,840 | B2 | 10/2013 | Sawyer et al. |
| 8,726,424 | B2 | 5/2014 | Thomas et al. |
| 8,777,191 | B2 | 7/2014 | Kligerman et al. |
| 8,782,989 | B2 | 7/2014 | Tang |
| 8,789,340 | B2 | 7/2014 | Dixon et al. |
| 8,915,339 | B2 | 12/2014 | Kanous et al. |
| 8,919,054 | B2 | 12/2014 | Tillery et al. |
| 8,919,069 | B2 | 12/2014 | Bird et al. |
| 8,998,298 | B2 | 4/2015 | Gerwolls et al. |
| 9,194,136 | B2 | 11/2015 | Cormier et al. |
| 9,249,853 | B2 | 2/2016 | Cormier et al. |
| 9,260,823 | B2 | 2/2016 | Craven |
| 9,279,258 | B2 | 3/2016 | Cormier et al. |
| 9,394,702 | B2 | 7/2016 | Cormier et al. |
| 9,420,843 | B2 | 8/2016 | Cormier et al. |
| 9,462,843 | B2 | 10/2016 | Cormier et al. |
| 9,528,280 | B2 | 12/2016 | Cormier et al. |
| 9,622,534 | B2 | 4/2017 | Cormier et al. |
| 9,644,699 | B2 | 5/2017 | Cormier et al. |
| 9,739,053 | B2 | 8/2017 | Cormier et al. |
| 10,047,484 | B2 | 8/2018 | Sawyer |
| 10,156,045 | B2 | 12/2018 | Penland et al. |
| 10,220,736 | B2 | 3/2019 | Cormier et al. |
| 10,369,739 | B2 | 8/2019 | Cormier et al. |
| 10,378,220 | B2 | 8/2019 | Paul et al. |
| 10,711,469 | B2 | 7/2020 | Brown |
| 10,982,451 | B2 | 4/2021 | Cormier et al. |

(56) References Cited

U.S. PATENT DOCUMENTS

| | | | |
|---|---|---|---|
| 2003/0154676 A1 | 8/2003 | Schwartz | |
| 2003/0177729 A1 | 9/2003 | Sabados | |
| 2005/0133324 A1 | 6/2005 | Soto Bailon et al. | |
| 2007/0267261 A1 | 11/2007 | Toccalino et al. | |
| 2008/0176010 A1 | 7/2008 | Sawyer et al. | |
| 2009/0165414 A1 | 7/2009 | Burk et al. | |
| 2010/0203292 A1 | 8/2010 | Seth et al. | |
| 2010/0313510 A1 | 12/2010 | Tang | |
| 2011/0072748 A1 | 3/2011 | Simonson et al. | |
| 2011/0135852 A1* | 6/2011 | Sawyer | E04F 15/107 428/17 |
| 2014/0007761 A1 | 1/2014 | Haidar | |
| 2014/0097052 A1* | 4/2014 | Reynolds | F16F 7/127 188/377 |
| 2015/0059276 A1 | 3/2015 | Valentine | |
| 2016/0053498 A1 | 2/2016 | Brown | |
| 2016/0123021 A1 | 5/2016 | Cormier et al. | |
| 2018/0073254 A1 | 3/2018 | Hainbach et al. | |
| 2018/0080235 A1 | 3/2018 | Downey et al. | |
| 2018/0148937 A1* | 5/2018 | Brown | E04F 15/02183 |
| 2018/0202150 A1 | 7/2018 | Downey et al. | |
| 2019/0136548 A1 | 5/2019 | Jang et al. | |
| 2020/0141132 A1* | 5/2020 | Cormier | A47G 27/02 |
| 2020/0149292 A1 | 5/2020 | Downey et al. | |
| 2024/0003143 A1* | 1/2024 | Audi | E04F 15/22 |
| 2026/0043253 A1* | 2/2026 | Reichelt | E04F 15/225 |

FOREIGN PATENT DOCUMENTS

| | | |
|---|---|---|
| FR | 2209867 | 7/1974 |
| JP | 08085404 | 4/1996 |
| JP | 9150692 | 6/1997 |
| JP | 11348699 | 12/1999 |
| KR | 101011907 | 2/2011 |
| KR | 101363159 | 2/2014 |
| WO | 8203099 | 9/1982 |
| WO | 93/00845 | 1/1993 |
| WO | 97/11825 | 4/1997 |
| WO | 00/31434 | 6/2000 |
| WO | 2006/038029 | 4/2006 |
| WO | 2013/183989 | 12/2013 |

* cited by examiner

DUAL-PURPOSE PROGRESSIVE STAGE LOAD-DISTRIBUTING AND ABSORBING SYSTEM

CROSS REFERENCE TO RELATED APPLICATION

This application is a continuation-in-part of U.S. Ser. No. 17/854,604, filed on Jun. 30, 2022, now U.S. Pat. No. 12,460,427 issued Nov. 4, 2025, which is incorporated by reference herein.

BACKGROUND OF THE INVENTION

(1) Field of the Invention

Several aspects of this disclosure relate to a dual-purpose progressive stage, multi-tiered load-distributing and absorbing system. One non-limiting exemplary field of use is for comfort underfoot and injury protection following a fall in environments exposed to foot traffic, such as but not limited to eldercare or senior living facilities.

(2) Background

In environments that are subjected to foot traffic, it would be desirable to have a load absorbing and distributing system that receives percussive impacts and reduces impact forces. Such a system would provide comfort in walking or standing, yet reduce the potential risk of injury associated with fall-related impacts. Potential benefits include reducing injury risk due to falls on the flooring surface, minimizing system cost, maintaining system durability, facilitating installation, and abating noise while offering surface quality and comfort for both patients and caregivers.

Among the art considered in preparing this patent application is commonly owned U.S. Pat. No. 10,982,451. That document discloses (see, e.g., col. 5, lines 50-54; FIGS. 5-6) alternative embodiments of a compliant stage region, including a lobe feature and a star-shaped feature. From the viewpoints of manufacturing ease and efficiency, it would be desirable to make a compliant stage with a flat top. The '451 patent is incorporated by reference herein.

SUMMARY

To meet such needs, a dual-purpose progressive load-distributing and absorbing system is provided. Such a system has a dual purpose: it offers an initial compliant reaction to the load, followed by a stiffer reaction to the load. The system protects an underlying foundation, while offering a graduated response to the applied load. Deformation begins relatively quickly and compliantly. Thereafter, the resistance becomes stiffer. After load removal, the system springs back non-destructively to its undeformed configuration.

In one embodiment, the progressive load-distributing and absorbing system has one or more multi-tier, hat-shaped absorbing members. At least some of the absorbing members is provided with a basal portion of thickness (T).

A curvilinear wall extends upwardly from the basal portion. The curvilinear wall defines a number (N) of tiers that telescopingly cooperate in response to and resist the applied load. At least some of the tiers have a curvilinear wall section with a height (H), an average wall thickness (T), an angle of inclination (θ), a shoulder having a length (D), and a radius portion between the shoulder and the wall section of an adjacent tier. The radius portion has a radius (R).

In some embodiments, the tiers have a compliant region, an optional intermediate region, and a protective region.

The compliant region has one or more compliant tiers that at least partially absorb forces initially resulting from the applied load. In several embodiments, the compliant tiers lie in an upper portion of an absorbing member.

The protective region lies below the intermediate region and has one or more protective tiers extending below the intermediate region. Preferably, the protective tiers deflect substantially after the compliant tiers have absorbed the forces initially resulting from the applied load.

Shoulders form transition regions between the protective, intermediate and compliant regions, and provide transition zones between a relatively soft resistance offered by the compliant region and a relatively stiff resistance presented by the protective region.

The one or more tiers in the protective region deflect after the tiers in the compliant region.

A relatively flat ceiling portion that lies above an uppermost compliant tier.

In use, the curvilinear wall section return to their pre-impact configuration and strength after the applied load is removed.

Illustrative examples of suitable environments in which the energy absorbing system may be deployed include pedestrian environments where it is desirable to provide comfort underfoot and injury protection following a fall. Nonlimiting examples of such an environment include an elder care facility, a hospital, an infant playground, and a factory floor.

In a preferred embodiment, one version of the system resembles a wedding cake and lies below a barrier layer such as a flooring material that is exposed to percussive or point-applied forces. The progressive load-distributing and absorbing system is interposed between the flooring material and a foundation.

To cover an area of intended use, one form of progressive load-distributing and absorbing system has one or more tiles. At least some of the tiles have a barrier layer that lies below the flooring material. Below the barrier layer lies one or more multi-tier, comfort-providing and injury-protecting hat-shaped absorbing members. The tiers are separated by the shoulder portions. At least some of the hat-shaped absorbing members have a basal portion that is positioned adjacent to the foundation, and a curvilinear wall extending upwardly from the basal portion.

The curvilinear wall has a relatively soft, compliant, comfort region proximate the ceiling. Below the comfort region, there is an intermediate region and a protective region having one or more tiers. Shoulder portions separate the comfort, intermediate and protective regions.

The comfort region has shorter, thinner walls than the stiffer protective region, and provides a soft footfall while having a relatively lower resistance to percussive or point-applied forces.

In contrast, the stiffer, protective region has a relatively higher resistance to the percussive or point-applied forces transmitted through the comfort and intermediate regions, thereby providing protection from an injury sustained from a fall above the flooring material. It will be appreciated that the protective region deflects after the comfort region in response to the load.

After the percussive or point-applied forces no longer impact the flooring material. the curvilinear wall sections return to their pre-impact configuration and strength.

Desirable features of an underlayment system for impact protection are comfort and vibration damping underfoot.

The ideal underlayment product would provide enhanced comfort underfoot while affording enhanced impact protection. In this context, the system disclosed herein offers a dual purpose.

Against this background, it would be desirable to develop a progressive stage load distribution and absorption system that underlies a flooring system to mitigate injuries and soften footfalls, while reducing noise and vibration where possible.

Ideally, such a system would be relatively low cost and present a low profile to minimize tripping, yet be durable. In several embodiments, an underlayment infrastructure would be compatible with a superstructure material such as sheet vinyl and carpet.

Several embodiments contemplate one or more progressive stage load distributing and absorbing tiles that are positioned side-by-side. At least some of the tiles have a barrier layer that lies below the superstructure material-primarily to distribute, rather than absorb an impacting force, such as a heavy footfall.

The underlayment infrastructure in a typical tile has one or more progressive stage, multi-tiered "hat-shaped" (defined below) absorbing members. In a preferred embodiment, each of those members has a relatively soft initial load transmission characteristic that preferably lies below and next to the barrier layer. This region first transmits forces from the hit to another intermediate or stiff region. In this disclosure, "relatively" broadly refers to the relative stiffness of the stiff or protective and compliant or soft absorbing regions in response to a hit.

The compliant region may be uppermost (preferably), or in some embodiments be lowermost. After the compliant region deflects and perhaps bottoms out, the primary role of one or more layers in the stiff stage region reverts to load absorption, rather than load transmission.

The basal portion originates as a sheet material that is preferably thermoformed to produce the stiff and compliant regions in the progressive stage absorbing members. Alternative manufacturing methods include compression molding, casting, vacuum forming, and injection molding.

In at least some of the stiff stage progressive absorbing members, the curvilinear wall has sections separated by shoulder portions that extend from the ceiling toward the base. Preferably, such a wall section has a draft angle (θ) that lies between about 4 and 40 degrees.

Following impact from above, a load is transmitted across the barrier layer initially to the compliant stage region of the progressive stage absorbing members of the underlayment infrastructure. Forces associated with the load travel downwardly and are transmitted by the wall of the compliant stage region. They then reach across a shoulder, portion and then via an intermediate region to another tier in the stiff region, and so on until the forces reach the stiff region before impinging on the foundation.

One result of these regions cooperating in the described manner is that the compliant stage absorbing region deflects before one or more of the stiffer transmission stage absorbing regions in response to the load. The relatively stiff region is available to absorb what remains of the impacting load after the compliant stage has deflected or bottomed out. Consequently, footfalls are softened, vibration is lessened, noise is reduced and injury after a fall is mitigated.

Accordingly, several embodiments of this disclosure include a dual-purpose, multi-tiered progressive stage load distributing and progressive stage energy absorbing system that lies below a barrier layer or superstructure material that is exposed to continual or intermittent percussive loads. Often, such forces may cause high localized pressure, such as when forces from a wheelchair are exerted by narrow wheels.

In the absorbing system, load absorption and distribution are mainly provided by groups of progressive stage absorbing members positioned in tiles (described below). Tiles are united by the inter-engagement of overlapping barrier layers that overhang the ceilings of adjacent tiles.

DETAILED DESCRIPTION

As required, detailed embodiments of the present disclosure are shown and described. However, it is to be understood that the disclosed embodiments are merely exemplary of the disclosure that may be embodied in various and alternative forms. The Figures are not necessarily to scale; some features may be exaggerated or minimized to show various details. Therefore, specific structural and functional details disclosed herein are not to be interpreted as limiting, but merely as a representative basis for teaching one skilled in the art to variously employ alternative embodiments.

Figure 1:
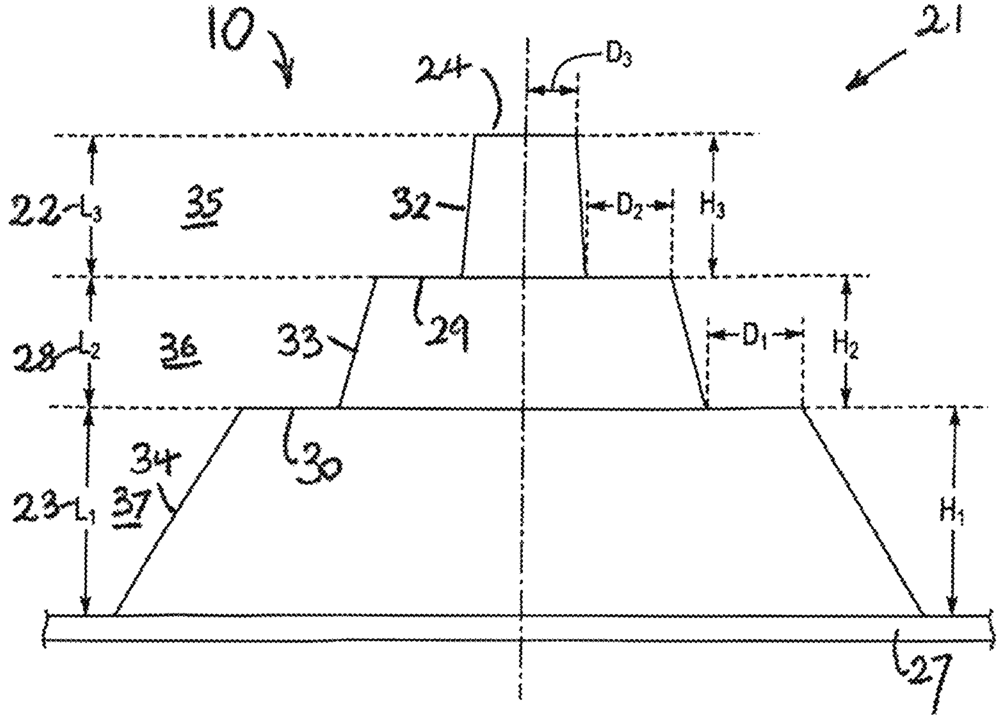
FIG. 1 is a side view of one embodiment of a multi-purpose, multi-tiered, progressive stage load distributing and absorbing underlayment system.

This disclosure includes a multi-purpose, multi-stage progressive stage load distributing and absorbing system 10 (FIGS. 1 and 6) that lies below a barrier layer 18 (FIGS. 3-5) which is exposed to steady or intermittent percussive forces. Such forces include (but are not limited to) a footfall, a rolling bed, a wheelchair, or a falling patient in an eldercare facility. In some embodiments, system 10 resembles a wedding cake. In other embodiments, the system 10 may be inverted. The progressive stage load distributing and absorbing system 10 is interposed between the barrier layer 18 (such as tile or carpeting, for example) 12 and a foundation 16 below.

More details of exemplary embodiments now follow. One embodiment has one or more multi-region, hat-shaped absorbing members 21. The regions include a compliant region 22, an optional intermediate region 28 and a protective region 23. In each region there may be one or more tiers. At least some of the absorbing members 21 is provided with a basal portion 27 having a thickness (T) FIG. 2), preferably made of a material selected from the group consisting of polypropylene, polycarbonate, thermoplastic polyurethane and mixtures thereof.

The curvilinear wall 26 extends upwardly from the basal portion 27. The curvilinear wall defines a number (N) of tiers or layers that telescopingly cooperate in response to and resist the applied load. At least some of the tiers are characterized by a curvilinear wall section having a height (H) (FIGS. 1-2), an average thickness (T), an angle of inclination (θ), a shoulder having a length (D), and a radius portion between the shoulder and the wall section of an adjacent tier, the radius portion having a radius (R). In the illustrative Figures, there are two shoulder portions 29, 30 and three regions 22, 28 and 23.

The tiers can be considered as having a compliant region 22, an optional intermediate region 28, and a protective region 23. Each region has one or more tiers or layers.

The compliant region 22 has one or more compliant tiers that at least partially absorb forces initially resulting from the applied load. As shown, the one or more tiers in the compliant region 22 lie in an upper portion of an absorbing member 21 when oriented as a wedding cake.

The protective region 23 lies below the intermediate region 28 and has one or more protective tiers extending below the intermediate region 28. The protective tiers 23 deflect substantially after the compliant tiers have absorbed the forces initially resulting from the applied load. It will be appreciated that each of the compliant 22, intermediate 28 and stiff 23 regions may have one or more tiers.

Shoulder portions 29, 30 form transition regions between the protective 23, intermediate 28 and compliant 22 regions and provide transition zones between a relatively soft resistance offered by the compliant region 22 and a relatively stiff resistance presented by the protective region 23.

In response to an applied load, the tiers in the protective region 23 deflect after the tiers in the compliant region 22.

As shown, the ceiling portion 24 in the orientation shown, lies above an uppermost tier in the compliant region 22.

By suitable selection of characterizing values (T) (θ), (D) and (N), in use, portions of the curvilinear wall 26 return to their pre-impact configuration and strength after the applied load is removed. As shown, the curvilinear wall 26 includes wall sections 32, 33, 34 and shoulder portions 29, 30.

The barrier layer 18 below which the absorbing members 21 are positioned transmits and distributes incident forces so that after the load is applied to the barrier layer 18, the absorbing members 21 react by a deflection mode that is characterized by an initial absorption by the compliant region 22, followed by a stiffer resistance progressively presented by the intermediate 28 (if present) and protective 23 regions.

Figure 2:
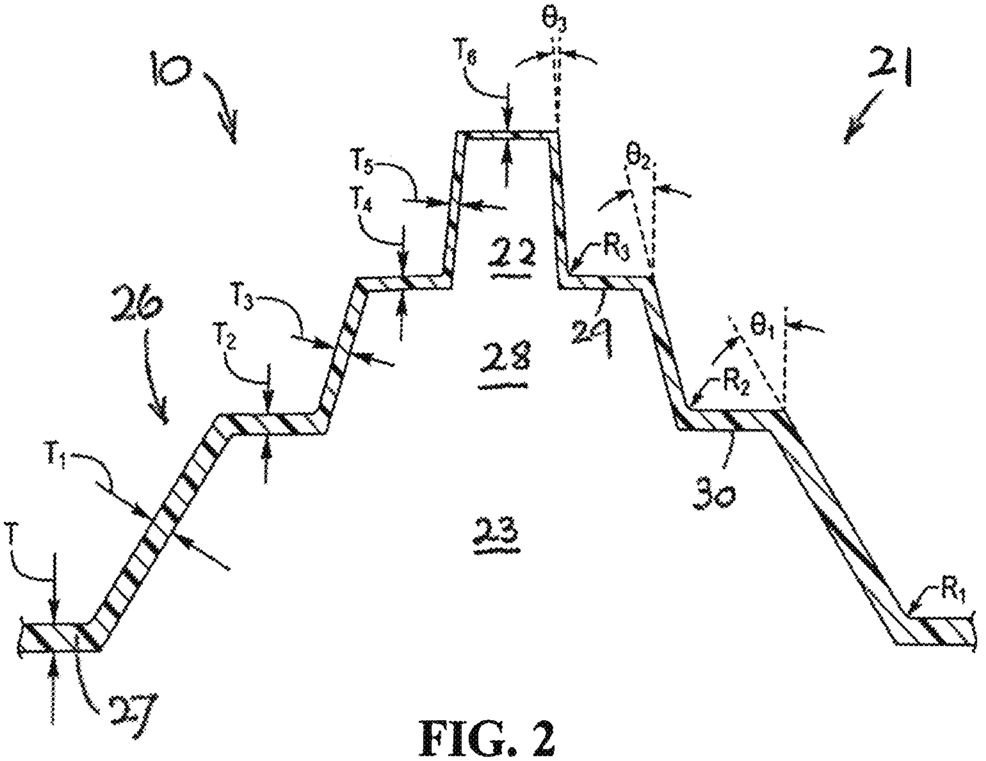
FIG. 2 is a cross sectional view of one embodiment of the load distributing and absorbing underlayment system.

Referring to FIG. 2, an exemplary absorbing member 21 has a wall section 34 with an average thickness ($T_1$) and the intermediate region 28 has a wall section 33 with an average thickness ($T_3$), so that ($T_1$)>($T_3$). If thermoforming is the manufacturing method of choice, a tendency toward wall section thinning occurs when fluid material is drawn into a desired configuration during the thermoplastic state. Hence the use of the term "average" in referring to thinness.

Further, the intermediate region 28 has a wall section 33 with the average thickness ($T_3$) and the compliant region 22 has a wall section 32 with an average thickness ($T_5$), so that ($T_3$)>($T_5$).

Still further, the ceiling 24 has a thickness ($T_6$) and the compliant region 22 has the wall section 32 with an average thickness ($T_5$), so that ($T_5$)>($T_6$).

In several applications, the barrier layer 18 may be a ceramic tile, solid wood, a wood composite, a carpet, a carpet tile, sheet vinyl, a vinyl tile, a rigid vinyl tile, a rubber sheet, a rubber tile, a grating, or an anti-slip metallic surface, or a rigid thermoplastic, a composite and a metal.

It will be appreciated that the foundation 16 may for example be a concrete slab, gravel, metal, a hardboard, or a hardwood.

When viewed from above before installation, at least some of the protective 23 or soft 22 regions have a footprint with a shape selected from the group consisting of a circle, an oval, an ellipse, an oblong, a cloverleaf, a race-track, and other curved perimeters.

A group of absorbing members 21 may form a tile. One or more tiles of absorbing members may be assembled to at least partially cover a surface that may be exposed to impacting forces. A barrier layer 18 of a first tile may extend from an edge thereof and overhang at least some of the ceilings 24 associated with absorbing members 21 of an adjacent tile.

In such arrangements, groups of tiles are conjoined. At least some of the absorbing members 21 have a load-attenuation characteristic such that within a group, there is a user-determinable force attenuation property that may be uniform or varied within the group.

In this way, a group of conjoined tiles may have an energy absorption characteristic that differs from another group of conjoined tiles. Accordingly, tiles that underlie a first installation site (e.g., a doorway) may present a different footfall than a group of tiles that underlie another installation site (e.g. flooring that underlies a bed)S.

Depending on the environment of use, the barrier layer 18 may include a surface selected from the group consisting of a floor located in a senior living or elder care facility, a hospital or out-patient facility, a daycare floor, and flooring material in homes and residences.

Returning to other features of an absorbing member 21, a curvilinear wall section 34 in the protective region 23 has a draft angle ($\theta_1$), a curvilinear wall section 33 in the intermediate region 28 has a draft angle ($\theta_2$), and a curvilinear wall section 32 in the compliant region 22 has a draft angle ($\theta_3$). Preferably, ($\theta_1$)<($\theta_2$)<($\theta_3$). In this way, downwardly applied force tends to produce a splaying effect in the soft 22, intermediate 28 and protective 23 regions.

In the exemplary embodiment depicted, the absorbing member 21 has one tier 35 in the soft compliant region 22. In other embodiments, more tiers may be provided in the compliant region 22 to offer for example a graduated response to a footfall before engaging the intermediate 28 or protective 23 regions.

The selection of suitable radii in the manufacturing process influences the performance characteristics of an absorbing member 21. Consider a radius ($R_1$) between a wall section 34 in the protective region 23 and the base 27; a radius ($R_2$) between a wall section 33 in the intermediate region 28 and a shoulder 30 extending from the wall section 34 in the protective region 23; and a radius ($R_3$) between a wall section 32 in the compliant region 22 and a shoulder 29 extending from the wall section 33 in the intermediate region 28. Preferably, ($R_1$)<($R_2$)<($R_3$). Without being bound by a particular theory, localized thermoplastic material flow is enhanced in the manufacturing stage. In response to a load, in use, the absorbing member may rebound or recoil non-destructively.

Suitable choices for the barrier layer 18 may include a material such as a floor located in a senior living or elder care or daycare facility; a hospital or out-patient facility; a home or residence; and a marine environment, including boating decks and docks; a sports-playing surface; a walking/running track; a golf playing surface; a soccer, rugby, lacrosse, or football field; a stairway; a work mat; a work platform; an anti-fatigue mat; an enhanced comfort mat; a wall protection material; a playground; a military blast mat; and a seat in a military vehicle that may detonate a land mine.

This disclosure also includes a method for providing a progressive load-distributing and absorbing system 10 that is positioned between a barrier layer 18 and a foundation 16. The barrier layer is exposed to percussive or point-applied forces. The method involves the following steps, not necessarily practiced in the sequence listed:

(A)) practicing one or more thermoforming or injection molding steps to form one or more absorbing members, such that in one or more absorbing members, a curvilinear wall section in the protective region has a draft angle ($\theta_1$), a curvilinear wall section in the intermediate region has a draft angle ($\theta_2$), and a curvilinear wall section in the compliant region has a draft angle ($\theta_3$), where ($\theta_1$)<($\theta_2$)<($\theta_3$) degrees;

(B) assembling one or more tiles of absorbing members;

(C) installing one or more tiles of absorbing members above the foundation; and (D) installing a barrier layer above the one or more tiles of absorbing members.

As a result, the compliant region provides a soft footfall because the compliant region has a relatively lower resistance to the percussive or point-applied forces in relation to the intermediate and protective regions. In this way, protection is provided from an injury sustained from a fall above the barrier layer in part because the protective region deflects after the compliant region in response to the load. At least some curvilinear wall sections in a tile return to their pre-impact configuration and strength after the percussive or point-applied forces are removed.

In general, the walls or tiers of the protective region 23 are shorter than a wall of the compliant region 22. A radius may be associated with a transition region between a wall portion and a shoulder. In general, a large radius permits more flow of semi-fluid material in a thermoforming step. Lower resistance to an applied load for the "drawn feature" (e.g., compliant stage 22) is offered compared to a "host feature" (e.g., stiff stage 23). The wall of the compliant stage 22 is usually thinner and taller than the wall of a tier in the protective region 23.

Such a structure could be installed so that base 27 is positioned adjacent to the barrier layer 18. In this inverted configuration, the "ceiling" portion 24 is positioned adjacent to the foundation 16. Note that the plane (or ceiling or floor portion) of each member 21 is flat (i.e., it lacks a drawn feature, such as a lobe or star-shaped feature that is disclosed in U.S. Pat. No. 10,982,451) and lies parallel to the foundation 16.

Figure 3:
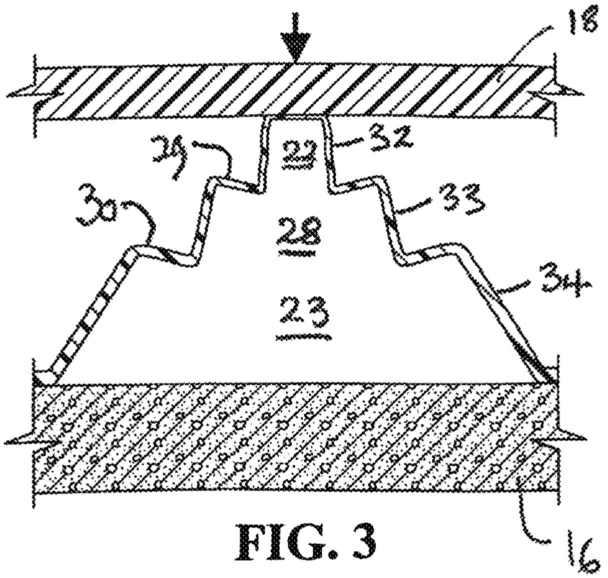
FIGS. 3-5 are cross sectional views that illustrate progressive collapse, first of the comfort (relatively soft) layer, then of an Intermediate region, and then of the protective (relatively stiff) region in response to load application. Reversion to an undeflected configuration is not shown. That state is shown in FIG. 3. In the embodiment depicted, the comfort region recovers before the protective region.
Figure 4:
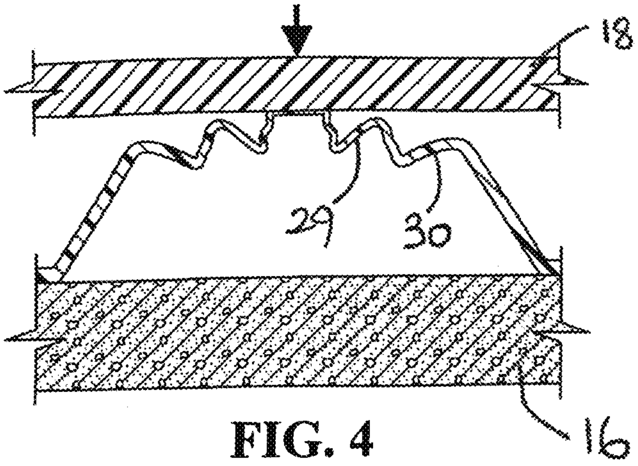
Figure 5:
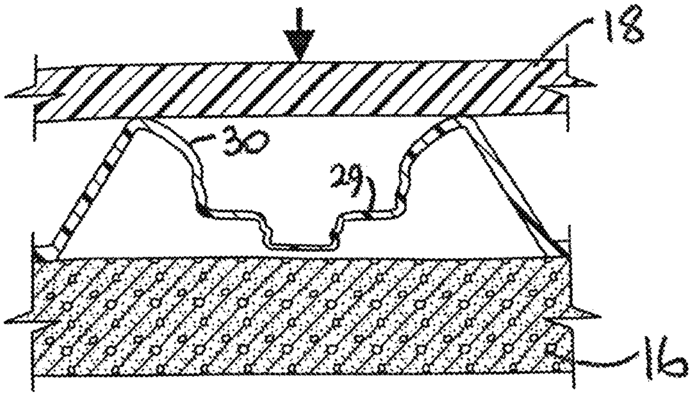
Figure 6:
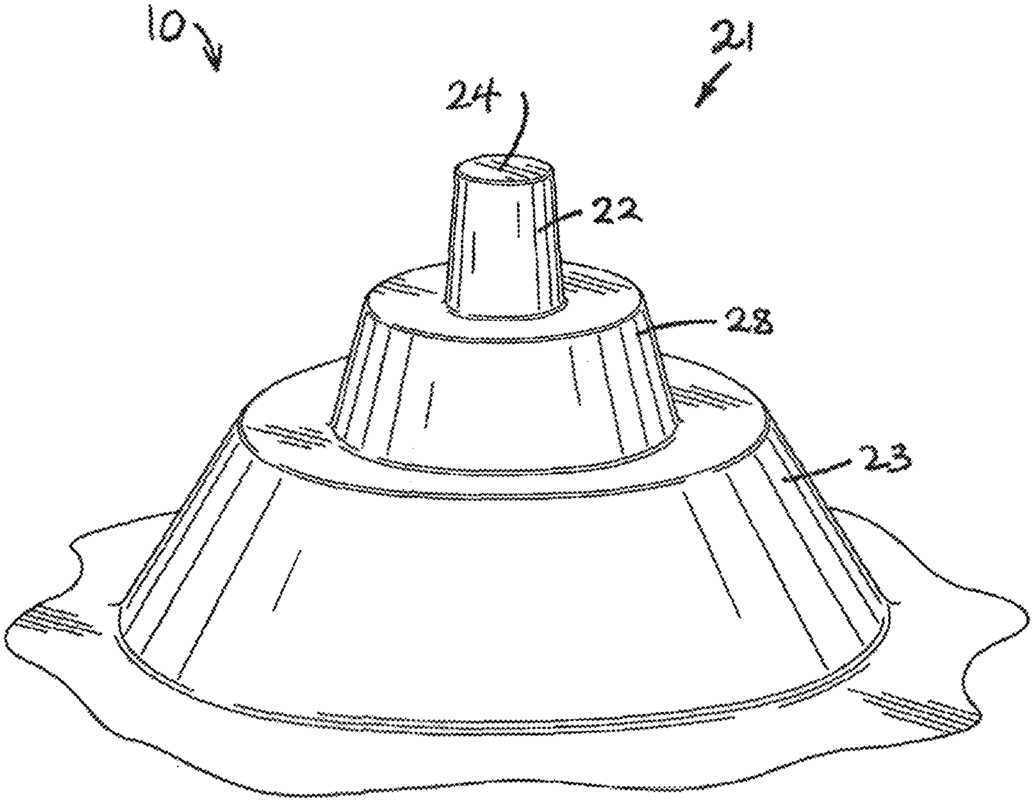
FIG. 6 is a perspective view of the absorber before a load is applied. That view also depicts the absorber after the load is removed and spring-back has occurred.

Consider FIGS. 3-5. They show that under an initial applied load (e.g., a footfall), the compliant stage 22 (weaker members) begin compressing and absorbing a portion of the total load exerted (FIG. 3). The protective region 23 at first remains substantially undeflected. Compression of the compliant stage 22 continues until the shoulder 29 above the intermediate region 28 begins to sag in response to the applied load. Some columnar buckling in the wall section 32 may occur. At that stage, the force required to compress the system further is greater than that required to compress the compliant stage 22. After the light load (e.g. a footfall) is removed, the system reverts to its undeflected state.

The compression characteristics of the soft, intermediate and stiff regions 22, 28, 23 can be tuned by selecting the material type, material thickness, draw depth, radii of curvature and the like to develop characteristics that enhance comfort underfoot, dampen vibrations, or absorb sound.

FIGS. 4-5 show the response of the system 10 to an even higher applied load. Under those load levels, which are likely to be at a level tuned to reduce the risk of a fall injury, both the taller (soft) 22 and intermediate 28 regions progressively collapse-first one or more tiers in the compliant region 22, then the intermediate region 28 and then the stiff region 23 deform in a controlled, non-destructive manner to absorb the impact load.

In each embodiment of the system, there is a progressive collapse of wall sections from the weakest to the strongest.

After the load is removed (FIG. 6), the system reverts to an undeflected state, with the compliant stage 22 usually being the first to bounce back. One attribute of the system is that successive hits and reversions to an undeflected state occur without weakening the system.

As used herein the term "hat-shaped" includes frusto-conical, which may or may not be inverted, as described above. Such hat-shaped members 21 may have a top wall portion that has a footprint that is circular, oval, elliptical, a cloverleaf, a race-track, or some other rounded shape with a curved perimeter. Similarly, for intermediate and stiff regions in an absorbing member 21. As used herein the term "hat-shaped" includes shapes that resemble those embodied in at least these hat styles: a boater/skimmer hat, a bowler/Derby hat, a bucket hat, a cloche hat, a fedora, a fez, a gambler hat, a homburg hat, a kettle brim or up-brim hat, an outback or Aussie hat, a panama hat, a pith helmet, a porkpie hat, a top hat, a steam punk hat, a safari hat or a trilby hat. See, e.g., https://www.hatsunlimited.com/hat-styles-guide, which is incorporated by reference.

As used herein the terms "hat-shaped" and "frusto-conical" exclude structures that include a ridge line or crease in a continuous curvilinear wall 26 associated with an absorbing member 21, because such features tend to promote stress concentration and lead to probable failure over time when exposed to percussive blows. They tend to concentrate, rather than distribute or absorb incident forces.

When viewed laterally, the curvilinear wall 26 appears substantially linear or straight before being subjected to an impact. When viewed from above or below, the footprint of the bottom portion or top portion may appear circular, elliptical, oval, or resemble a clover leaf, a race-track, or some other rounded shape with a curved perimeter.

The absorbing members 21 may be manufactured from a resilient thermoplastic and be formed into frusto-conical or hat-shaped members that protrude from a basal sheet 27 which before exposure to a forming process is substantially flat.

In one preferred embodiment, the barrier layer 18 is made from a strong thin layer of polycarbonate (PC), a composite or a metal or other suitable rigid material, the absorbing member 21 is made from resilient thermoplastic polyurethane (TPU).

With an overlying barrier layer 18, the absorbing members may form a tile. Adjacent tiles are inter-engaged by overlapping edges of the barrier layer 18. Preferably, a small, but acceptable, gap exists between barrier layers 18 associated with adjacent tiles to accommodate thermal expansion and facilitate installation.

The overlap of the barrier layers 18 and proximity of the absorbing members 22 on adjacent tiles distributes a load applied to the barrier layer 18 over a broad area. Loads are evenly distributed when applied either on a seam between adjacent tiles or within a tile. Loads are at least partially absorbed by flexure and possible rebound of the compliant and stiff stages in the absorbing members.

The embodiments shown in FIGS. 1-6 are to be considered as representative. They illustrate an embodiment with a number (N) of layers, where N=3. Those layers, from top to bottom, are a soft layer, an intermediate layer, and a stiff layer.

In some embodiments, there are two layers, so N=2, and there is no intermediate layer. In those embodiments, preferably the soft layer is uppermost, with the stiff layer lowermost.

If desired, the energy absorbing system may be inverted. In such cases, the soft layer is lowermost, and the stiff layer is uppermost.

In general, the energy absorbing system may be considered as having a number (N) layers, where $1<N<4$.

Where N=1, only the stiff layer is presented, and there is no intermediate or soft layer. In that case, preferably, the stiff layer is inverted.

Where N>3, there is at least one soft layer and at least one stiff layer. When N>3, the energy absorbing system can be inverted if desired, so that the soft layer is lowermost.

Preferably, the single stiff layer or (if multiple layers) the largest layer is oriented so that its smaller dimension faces the foundation. In such cases, the larger dimension is located proximate the underside of a surface product.

In more detail, selected features of the disclosed progressive load distributing and absorbing system include:

A: Engineered Performance Consistency

Traditional flooring systems, which are installed over rigid surfaces such as concrete, tend to have little energy absorbing capabilities, thereby posing a risk for fall related injuries. Due the rigid nature of their construction, they do however provide a consistent surface in terms of firmness and stability under foot. A rigid surface such as a foundation supports the flooring product over its entire area. This is essential for products like ceramic tile, glass tile, wood flooring, and the like.

One challenge in developing, installing, and maintaining an attractive, yet compliant flooring system that reduces the risk of injury lies in engineering the system to maintain a consistent firmness and stability over the entire flooring surface throughout its normal life cycle while being compliant. The system must balance compliance needs, yet accommodate other activities like walking, running, rolling in a wheelchair, and supporting other items such as furniture, equipment, and other objects. An ideal load-distributing and absorbing system needs to be firm and stable under foot under such normal activities and at the same time be engineered to deflect or stroke to the greatest degree possible during a potentially injurious fall or impact event.

Additionally, the layers of the load-distributing and absorbing system need to work in concert in order to maintain an attractive appearance after years of repeated wear and abuse. Ideally, the system needs to remain unblemished before, during, and after impact events and everyday activities.

B: Enhanced Load Distributing and Absorbing Flooring System

Thermoforming begins with a basal sheet of material of constant thickness. The thermoplastic raw material is heated to the softening point and then stretched over a form tool via vacuum, pressure, and mechanical means. The thickness of the thermoformed part is a function of the base raw material thickness, raw material type, form temperature, and tool geometry, which includes depth of the draft, and draft angle. Also influential, as noted carlier, are the radii of curvature between a base and a compliant section wall. Also, the radius of curvature between a compliant section wall and a shoulder influences thickness and energy-absorbing behavior. Another factor is the radius between compliant region wall thickness and one or more associated shoulders. Generally, areas where the depth of draw is greatest, the material is stretched in multiple directions. This results in thicker wall profiles in areas that experience less stretching.

Load absorbing members typically produce a generally "square wave" force versus displacement response to an applied load. There is an initial ramp up in force until a wall buckles and then maintains a relatively constant reaction force to the applied load throughout the available stroke.

Testing has demonstrated that use of various embodiments of the disclosed system may lead to a:

20-fold reduction in risk of critical head injury;
60% reduction in the probability of moderate head injury;
3-fold reduction in GMAX;
2.5-fold reduction femoral neck force during falls for average older females;
3-fold increase in force reduction;
2.5-fold reduction in energy restitution;
firm and stable and stable surface that supports mobility;
substantially more comfort underfoot for caregivers and older adults.

Test data also indicate that the proposed progressive stage load distributing and absorbing systems have the potential to substantially reduce the risk of injury and improve the quality of life for both older adults and caregivers.

TABLE OF REFERENCE NUMBERS

| Reference No. | Component |
|---|---|
| 10 | Progressive stage load distributing and absorbing system |
| 16 | Foundation |
| 18 | Barrier layer |
| 21 | Absorbing member |
| 22 | Soft compliant stage absorbing region |
| 23 | Stiff protective stage absorbing region |
| 24 | Ceiling |
| 26 | Curvilinear wall |
| 27 | Basal portion |
| 28 | Intermediate region |
| 29, 30 | Shoulder portions |
| 32, 33, 34 | Wall sections |
| 35, 36, 37 | Tiers |

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A progressive load-distributing and absorbing system that is subjected to an applied load, the system comprising:

one or more multi-tier, hat-shaped absorbing members, at least some of the absorbing members having a basal portion with a thickness (T) made of a material selected from the group consisting of polypropylene, polycarbonate, thermoplastic polyurethane and mixtures thereof;

a curvilinear wall extending upwardly from the basal portion, the curvilinear wall defining a number (N) of tiers that telescopingly cooperate in response to and resist the applied load, at least some of the tiers being characterized by a curvilinear wall section having a height (H), an average thickness (T), an angle of inclination (θ), a shoulder having a length (D), and a radius portion between the shoulder and the wall section of an adjacent tier, the radius portion having a radius (R);

the tiers having a compliant region, an intermediate region, and a protective region, the compliant region having one or more compliant tiers that at least partially absorb forces initially resulting from the applied load, the compliant tiers lying in an upper portion of an absorbing member;

the protective region lying below the intermediate region and having one or more protective tiers extending below the intermediate region, the protective tiers deflecting substantially after the compliant tiers have absorbed the forces initially resulting from the applied load; wherein the protective region has a wall section with an average thickness ($T_1$) and the intermediate region has a wall section with an average thickness ($T_3$), so that ($T_1$)>($T_3$), wherein the shoulders form transition regions between the protective, intermediate and compliant regions and provide transition zones between a relatively soft resistance offered by the protective region and a relatively stiff resistance presented by the compliant region, wherein the tiers in the protective region deflect after the tiers in the compliant region; and a ceiling portion that lies above an uppermost compliant tier;

wherein the curvilinear wall portions return to their pre-impact configuration and strength after the applied load is removed.

2. The progressive load-distributing and absorbing system of claim 1, further including a barrier layer below which the absorbing members are positioned, so that after the load is applied to the barrier layer, the absorbing members react by a deflection mode that is characterized by an initial absorption by the compliant region followed by a stiffer resistance progressively presented by the intermediate and protective regions.

3. The progressive stage load-distributing and absorbing system of claim 2, wherein the barrier layer includes:

a surface selected from the group consisting of a floor located in a senior living or elder care facility, a hospital or out-patient facility, a daycare floor; and flooring material in homes and residences.

4. The progressive load-distributing and absorbing system of claim 1, wherein the intermediate region has a wall section with an average thickness ($T_3$) and the compliant region has a wall section with an average thickness ($T_5$), so that ($T_3$)>($T_5$).

5. The progressive load-distributing and absorbing system of claim 1, wherein the ceiling has a thickness ($T_6$) and the compliant region has a wall section with an average thickness ($T_5$), so that ($T_5$)>($T_6$).

6. The progressive stage load-distributing and absorbing system of claim 1, wherein the barrier layer is selected from the group consisting of a ceramic tile, solid wood, a wood composite, a carpet, a carpet tile, sheet vinyl, a vinyl tile, a rigid vinyl tile, a rubber sheet, a rubber tile, a grating, an anti-slip metallic surface including a material selected from the group consisting of a rigid thermoplastic, a composite and a metal.

7. The progressive stage load-distributing and absorbing system of claim 1, wherein the foundation is selected from the group consisting of a concrete, a gravel, a metal and a hardwood.

8. The progressive stage load-distributing and absorbing system of claim 1, wherein at least some of the compliant regions have a footprint with a shape selected from the group consisting of a circle, an oval, an ellipse, an oblong, a cloverleaf, a race-track, and other curved perimeters.

9. The progressive stage load-distributing and absorbing system of claim 1, wherein at least some of the protective regions in a tile have a footprint with a shape selected from the group consisting of a circle, an oval, an ellipse, an oblong, a cloverleaf, a race-track, and other curved perimeters.

10. The progressive stage load-distributing and absorbing system of claim 1, wherein groups of tiles are conjoined, at least some of the absorbing members having a load-attenuation characteristic such that within the group, there is a user-determinable force attenuation property that may be uniform or varied within the group.

11. The progressive stage load-distributing and absorbing system of claim 10, wherein a group of conjoined tiles has an energy absorption characteristic that differs from another group of conjoined tiles, so that tiles that underlie a first installation site may present a different footfall than a group of tiles that underlie another installation site.

12. The progressive stage load-distributing and absorbing system of claim 1, further including a curvilinear wall section in the protective region having a draft angle ($\theta_1$), a curvilinear wall section in the intermediate region having a draft angle ($\theta_2$), and a curvilinear wall section in the compliant region having a draft angle ($\theta_3$), where ($\theta_1$)<($\theta_2$)<($\theta_3$) degrees.

13. The progressive stage load-distributing and absorbing system of claim 1, wherein the absorbing member has multiple tiers in the protective region.

14. The progressive stage load-distributing and absorbing system of claim 1, further including a radius ($R_1$) between a wall section in the protective region and the base, a radius ($R_2$) between a wall section in the intermediate region and a shoulder extending from the wall section in the protective region, a radius ($R_3$) between a wall section in the compliant region and a shoulder extending from the wall section in the intermediate region, where $$(R_1) < (R_2) < (R_3).$$

15. The progressive stage load-distributing and absorbing system of claim 1, wherein the barrier layer includes:

a material selected from the group consisting of a surface comprising a floor located in a senior living or elder care or daycare facility; a hospital or out-patient facility; a home or residence; and a marine environment, including boating decks and docks;

a sports-playing surface;

a walking/running track;

a golf playing surface;

a soccer, rugby, lacrosse, or football field;

a stairway;

a work mat;

a work platform;

an anti-fatigue mat;
an enhanced comfort mat;
a wall protection material;
a playground;
a military blast mat; and
a seat in a military vehicle that may detonate a land mine.

* * * * *